(12) United States Patent
Sjölin et al.

(10) Patent No.: US 6,375,777 B1
(45) Date of Patent: Apr. 23, 2002

(54) PROCESS FOR THE PRODUCTION OF A THERMOSETTING LAMINATE

(75) Inventors: Hans Sjölin, Perstorp; Håkan Larsson, Dalby, both of (SE)

(73) Assignee: Perstorp AB, Perstorp (SE)

( * ) Notice: Subject to any disclaimer, the term of this patent is extended or adjusted under 35 U.S.C. 154(b) by 0 days.

(21) Appl. No.: 09/508,274

(22) PCT Filed: Sep. 2, 1998

(86) PCT No.: PCT/SE98/01557

§ 371 Date: Mar. 10, 2000

§ 102(e) Date: Mar. 10, 2000

(87) PCT Pub. No.: WO99/12736

PCT Pub. Date: Mar. 18, 1999

(30) Foreign Application Priority Data

Sep. 11, 1997 (SE) .............................................. 9703281

(51) Int. Cl.⁷ .............................................. B32B 31/00
(52) U.S. Cl. .................. 156/209; 156/288; 156/289; 156/307.5; 156/307.7; 156/322; 156/324
(58) Field of Search .................. 156/288, 289, 156/324, 209, 199, 247, 307.5, 307.7, 307.1, 322, 331.3

(56) References Cited

U.S. PATENT DOCUMENTS

| | | | | |
|---|---|---|---|---|
| 2,680,700 A | * | 6/1954 | Meyers | 156/288 X |
| 4,030,955 A | * | 6/1977 | Antonio et al. | 156/288 X |
| 4,557,778 A | | 12/1985 | Held | |
| 4,689,102 A | * | 8/1987 | Prawdzik et al. | 156/288 X |
| 4,816,314 A | * | 3/1989 | Prawdzik et al. | 156/288 X |

FOREIGN PATENT DOCUMENTS

| | | | | |
|---|---|---|---|---|
| DE | 2527012 A1 | * | 12/1976 | ................ 156/288 |
| DE | 4102630 | | 8/1992 | |
| GB | 1422554 | | 1/1976 | |
| JP | 49-35066 A | * | 9/1974 | ................ 156/288 |
| JP | 51-62875 A | * | 5/1976 | ................ 156/288 |
| JP | 52-22067 A | * | 2/1977 | ................ 156/288 |
| JP | 52-29870 A | * | 3/1977 | ................ 156/288 |
| JP | 52-33961 A | * | 3/1977 | ................ 156/288 |

* cited by examiner

*Primary Examiner*—Jeff H. Aftergut
(74) *Attorney, Agent, or Firm*—Stevens, Davis, Miller & Mosher, L.L.P.

(57) ABSTRACT

Process for the production of a thermosetting laminate made of a number of continuous paper webs impregnated with a thermosetting resin. The dry webs are fed continuously between an upper and a lower press belt (101 and 102 respectively) of a continuous double belt press (100). The continuous paper webs are divided into at least two groups (10) each consisting of at least two sheets of which at least one is impregnated with a thermosetting resin. One or more separation sheets (1) are placed between the groups (10) of paper webs.

37 Claims, 3 Drawing Sheets

PROCESS FOR THE PRODUCTION OF A THERMOSETTING LAMINATE

Figure 1:
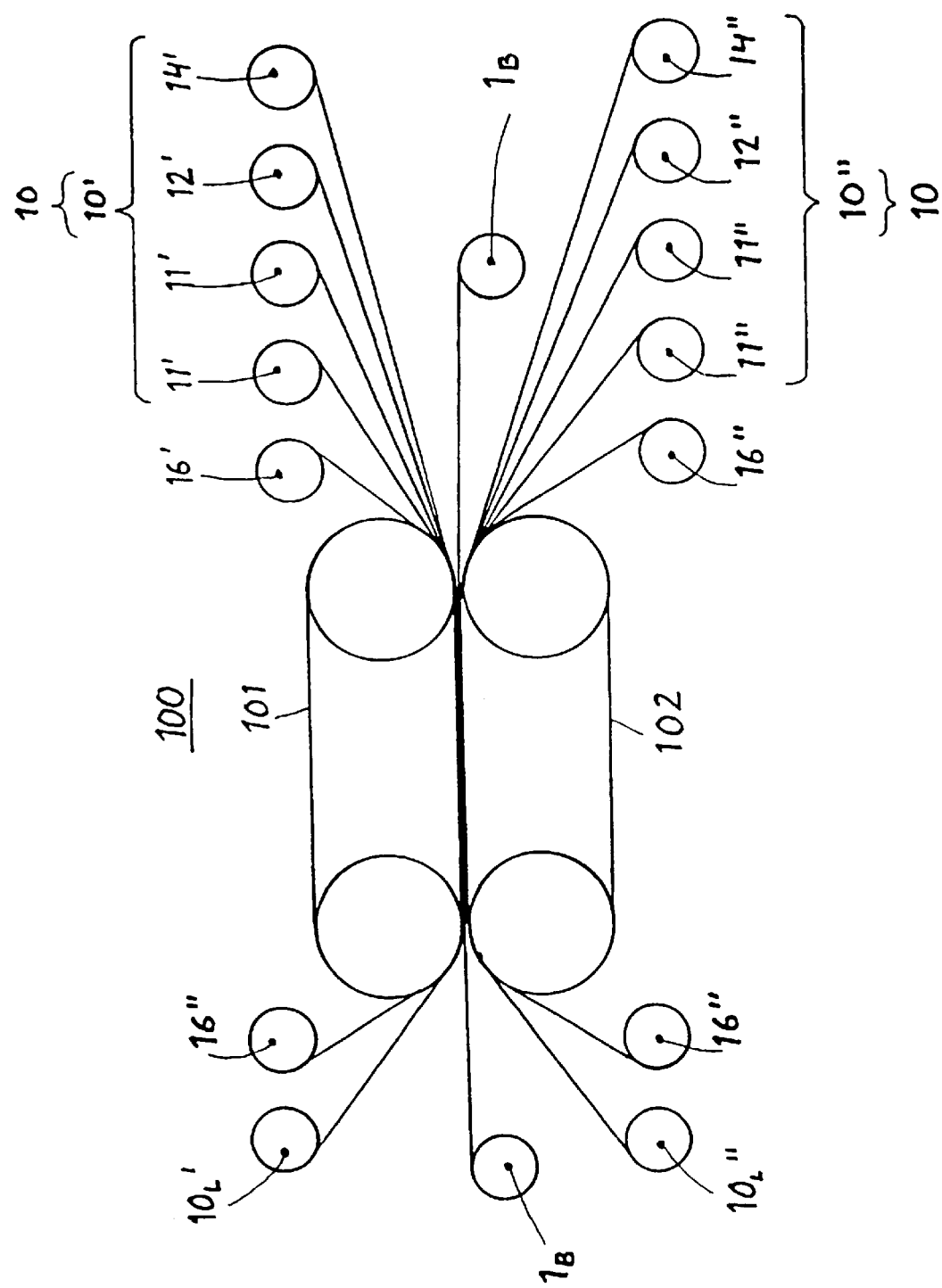

The present invention relates to a process for the production of a thermosetting, preferably decorative laminate.

Products with a surface layer of thermosetting resin are frequently used today. They are used mostly where the demands for abrasion resistance are high but also where resistance against different chemicals and humidity is requested. Flooring materials, skirtings, work tops, table tops, cupboards, wall panels and facades can be mentioned as examples on such products. The thermosetting laminate often consists of a number of base sheets with a closest to the surface placed decor sheet of paper and on top of the decor sheet usually one or more protective so-called overlay sheets of α-cellulose.

Thermosetting laminates are produced by laminating together at an increased pressure paper sheets or paper webs impregnated with a thermosetting resin. In respect of paper sheets this is made in a static press and in respect of paper webs in continuous presses. Continuous laminate presses have been known for a long time and they are manufactured for instance by the companies Kvaerner and Hymmen. The presses are furnished with two endless belts. The laminate is pressed between these belts.

For a long time there has been a great need of being able to produce a decorative thermosetting laminate in a rational a cost-effective way without decreasing the quality demands. One such method would be to produce two or more laminates at the same time in continuous presses. However, this has been considered to be impossible.

According to the present invention it has been possible to meet the above need whereby the cost efficiency at the production of thermosetting laminates has been considerably improved. Thus, the invention relates to a process for the production of a thermosetting preferably decorative laminate. The laminate is made of a number of paper sheets preferably in the form of continuous webs impregnated with a thermosetting resin and then dried. The dry paper webs are fed between the press belts of a continuous double belt press and laminated together in the press at an increased pressure and an increased temperature. The invention is characterised in that the continuous paper webs are divided into at least two groups each consisting of at least two sheets of which at least one is impregnated with a thermosetting resin, the sheets consisting of a) one or more decorative paper webs preferably impregnated with a thermosetting resin and/or b) one or more overlay paper webs of α-cellulose preferably impregnated with a thermosetting resin and/or c) one or more bottom colour paper webs preferably impregnated with a thermosetting resin and/or d) one or more base paper webs preferably impregnated with a thermosetting resin and one or more separation sheets which are placed between the groups of paper webs. The separation sheets are used for separating the groups of paper webs from each other after a finished pressing whereby at least two thermosetting laminates are obtained.

According to one embodiment of the invention the separation sheet for each group consists of an unimpregnated paper web, a paper web impregnated with a thermosetting resin on one side or a paper web coated with a thermosetting resin on one side. The unimpregnated or uncoated side is turned away from the laminate with the possibly coated or impregnated side turned inwards towards the laminate.

Alternatively the separation sheet for each group can consist of an impregnated paper web, an unimpregnated paper web, a paper web impregnated with a thermosetting resin on a first side or a paper web coated with a thermosetting resin on a first side while the other side of the web is coated or impregnated with a passive material. The first side is turned towards the respective group. The passive material then suitably consists of alginate, a metal such as aluminium or plastics such as electron cured acrylate, polyphenyl oxide, polyimide or polyvinylidene fluoride.

According to a second embodiment of the invention the separation consists of one or more separation webs.

A first and a second group of paper webs each comprising a decor paper web are used according to one embodiment of the invention. The decor paper web of the first group is directed with the decor towards the upper press belt with possible intermediate overlay paper webs and possible further underlying decor paper webs, bottom colour paper webs and base paper webs. The decor paper web of the second group is directed with the decor towards the lower press belt with possible intermediate overlay paper webs and possible further decor paper webs placed above, bottom colour paper webs and base paper webs. One or more separation webs are placed between the first group and the second group. Further groups of paper webs with intermediate separation webs can be fed between the press belts together with the first and the second group.

A first structure web is suitably placed between the upper press belt and the first group of paper webs. A second structure web is suitably placed between the lower press belt and the lower group of paper webs. The surface structure of the two structure webs is directed towards the respective paper webs, whereby the two laminates produced at the pressing are provided with a surface structure from the structure webs.

Alternatively the press belts of the continuous press can be furnished with a surface structure. Then the structure webs are eliminated.

A surface structure is above all used for increasing the realism of the decor of the decor paper web. The decor paper web can be provided with a decor or pattern as desired. Usual patterns tend to imitate different kinds of wood or mineral such as marble or granite. The decor can also be a wholly fancy pattern. The decor of the structure web gives a negative image thereof in the laminate at the pressing. The structure suitable reproduces characteristic features of the pattern the decor of the laminate represents. The structure can here be made rough to simulate for example a rough-hewn stone or be glossy with small pits and micro cracks placed at random to simulate polished marble. In order to simulate the surface structure of wood the laminate surface is furnished with thin elongated recesses to look like pores. These recesses must be turned in the growth direction of the simulated tree which is shown by the pattern of the graining to give a realistic result. Therefore, the graining and the simulated pores are often placed in the longitudinal direction of the laminate.

According to an alternative embodiment of the invention a first and a second group of paper webs each includes a decor paper web. The decor paper web of the first group is turned with the decor away from the upper press belt down towards an imagined middle plane with possible underlying overlay paper webs and possible further decor paper webs placed above, bottom colour paper webs and base paper webs. The decor paper web of the second group is then directed with the decor away from the lower press belt up towards an imagined middle plane with possible overlay paper webs placed above and possible further underlaying decor paper webs, bottom colour paper webs and base paper webs. One or more separation webs are placed between the first group and the second group. Further groups of paper webs with intermediate separation webs can be fed between the press belts together with the first and the second group.

The separation web can here preferably consist of
a) a metal such as aluminium steel and copper or
b) a plastic foil for example of polyamide, polyoxymethylene, polycarbonate, polyfluorethene, polyvinylidene fluoride, polyphenyl oxide, polyether sulphone, polyimide, polysiloxane or
c) paper preferably having a surface coating for example consisting of electron cured acrylate, polyphenyl oxide, polyimide, polyvinylidene fluoride, aluminium or the like.

The plastic foils according to c) above can suitably be reinforced with fiber reinforcement to get an increased endurance. Such reinforcement can for instance consist of glass fibers, carbon fibers, aramide fibers or cellulose fibers.

The separation web is suitably provided with a surface structure and two separation webs are placed back to back with the structure side towards the first respectively the second group of paper webs. Alternatively one separation web provided with a surface structure on both sides is used.

The separation web or webs are suitably heated by
a) preheating for example by means of an infra heater or an induction heater before the feeding of the webs between the press belts and/or
b) heating by means of an electric current passing the webs.

The curing process is hereby accelerated. A preheating is especially useful when separation webs with a high heat capacitivity are used. Metals can be mentioned as example of materials with a high heat capacitivity. In those cases where heating by means of passing an electric current is used, metal foils are preferred. The current is here conduced to and from the foil web via collector rolls placed at both ends of the press. Such a separation web can thereby be used as a heating medium at the pressing, whereby the pressing time can be shortened considerably especially at thicker laminates or at the production of many laminates at the same time in the press.

In addition to bringing about an acceleration of the curing process a preheating of the separation web or webs can be used for decreasing the risk of quality problems caused by differences in coefficient of temperature expansion between the separation webs and the other webs in the press. Such differences can otherwise cause local differences of the thickness of the goods.

Alternatively the laminates can be provided with a surface structure by means of one of more rolls provided with a structure pattern and counter rolls. The still warm laminates fed out of the continuous press are here allowed to pass between the rolls and the counter rolls with the decor side facing the rolls at a continuous or discontinuous pressure between the rolls and the counter rolls. The structure webs and the surface structure of the separation webs are then left out.

Thus, when the laminate formed has passed the press belts, rolls provided with a surface structure are pressed against the decor side of the laminate when the laminate passes between these rolls and their counter rolls. The laminate is then only partially cured. The laminate can then be cut into laminate sheets or rolled. The curing process will continue due to the inherent heat of the laminate. Therefore, the laminate will be fully cured.

The structure rolls and/or the counter rolls can if needed by heated, whereby the curing can be controlled. The counter rolls suitably consisting of metal rolls can also be coated on their press surface with a softer material such as an exchangable paper layer having a thickness of one or a few millimetres. The coating material can also consist of a rubber layer having a thickness of a few millimetres and a hardness of 30 Shore A–50 Shore D depending on the density and the depth of the surface structure. In this way the surface structuring is facilitated especially at deeper surface structures. The laminates can also when they have been furnished with a surface structure be heated for instance with an infra heater or hot air to accelerate the remaining curing.

The structure foil webs are preferably separated from their respective groups of paper webs by rolling them up on rolls when the laminates have passed out from the continuous press. The separation web or webs are removed in a similar way from the laminates. Then the backsides of the laminates are possibly ground. Thereby, the structure foil webs and the separation webs can be re-used. In those cases when a separation web or webs having a surface structure are used also these are preferably removed from their respective groups of paper webs by rolling them up on rolls when the laminates have passed out from the continuous press. Then the respective back sides of the laminates are possibly ground. The grinding of the back side is suitably made continuously on the continuous laminate web produced, but it can also be carried out when said laminate web has been cut to sheets.

The different paper webs which in various combinations are used for the production of the laminate according to the claimed process, suitably comprise
a) decor paper webs consisting of dry paper webs of α-cellulose or a traditional white paper impregnated with a thermosetting resin, the webs being provided with a decorative printing or surface layer and the thermosetting resin in the decor paper webs preferably consisting of melamine-formaldehyde resin
b) overlay paper webs consisting of dry paper webs of α-cellulose impregnated with a thermosetting resin consisting of melamine-formaldehyde resin
c) bottom colour paper webs preferably consisting of dry paper webs of α-cellulose or a traditional white paper impregnated with a thermosetting resin preferably consisting of melamine-formaldehyde resin
d) base paper webs consisting of conventional dry underlayer paper webs impregnated with a thermosetting resin, the thermosetting resin in the web placed closest to the decor paper web possibly consisting of melamine-formaldehyde resin while the rest of base paper webs preferably contain phenol-formaldehyde resin or mixtures of melamine-formaldehyde resin and phenol-formaldehyde resin. The various paper webs are dried after the impregnation. The solvent of the resin is evaporated at said drying and the thermosetting resin is partially cured to so-called B-stage. Then the dry paper webs are continuously laminated together at an increased pressure and an increased temperature.

The pressure in the press is 5–80 bar, preferably 20–70 bar, most preferably 30–70 bar especially 30–55 bar and the temperature if 80–250° C., preferably 150–200° C.

At least one of the paper webs impregnated with a thermosetting resin, preferably the outermost web is coated with hard particles for example silica, aluminium oxide and/or silicon carbide having an average particle size of less than 1000 $\mu$m.

The present invention is further illustrated in connection with the enclosed figures showing different embodiments of the invention whereby FIG. 1 schematically shows a continuous laminating process according to the invention.

Figure 2:
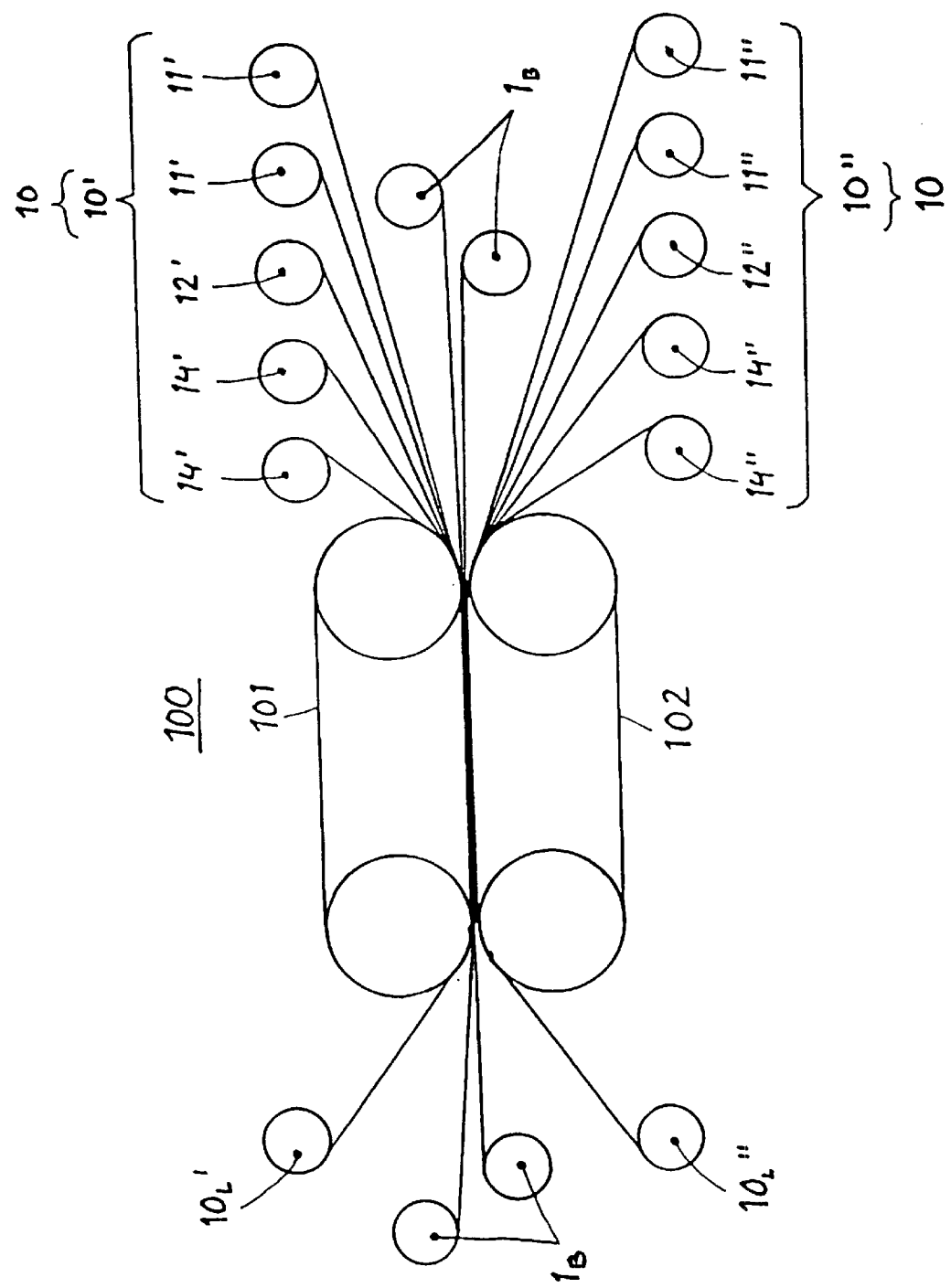
Figure 3:
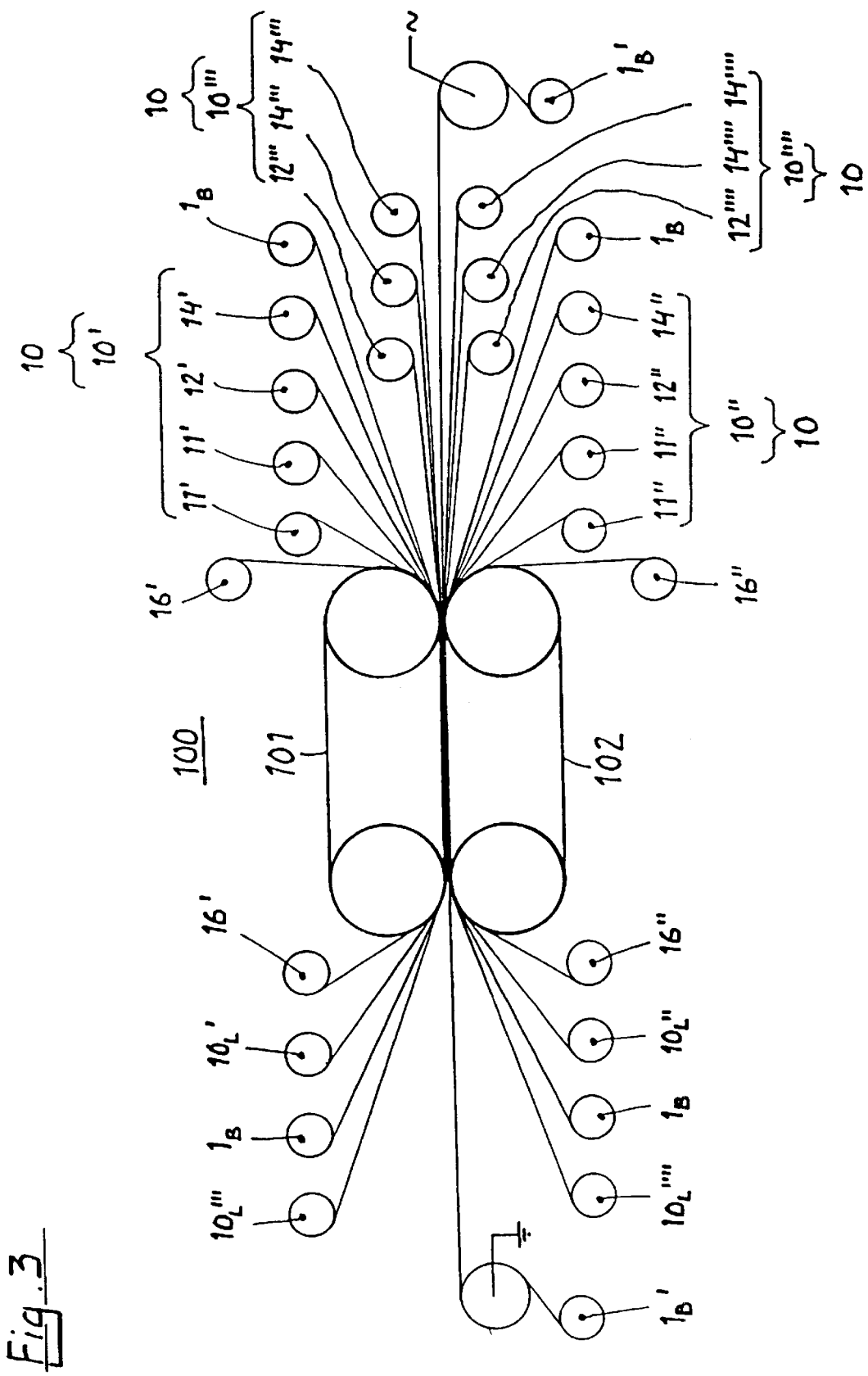

FIG. 2 schematically shows a continuous laminating process according to an alternative embodiment of the invention FIG. 3 schematically shows a continuous laminating process according to a further alternative of the invention.

FIG. 1 shows schematically a continuous laminating process for the production of a decorative thermosetting laminate. The laminate is produced from a number of paper sheets preferably in the form of webs impregnated with a thermosetting resin and then dried. The dry paper webs are fed between two press belts 101 and 102 of a continuous double belt press 100 and laminated together by pressing in the press at an increased pressure and an increased temperature. The paper webs are divided into two groups each consisting of four sheets, counted from the upper side of the finished laminate consisting of;

a) two overlay paper webs 11' and 11" respectively of α-cellulose impregnated with melamine-formaldehyde resin. The innermost of the overlay paper webs 11' and 11" respectively have been coated with hard particles in connection with the impregnation. The hard particles are placed on the side of the web which will be turned outwards from the laminate b) a decorative paper web 12' and 12" respectively impregnated with melamine-formaldehyde resin c) a base paper web 14' and 14" respectively impregnated with phenol-formaldehyde resin. The different paper webs are dried after the impregnation. At the drying the solvent is evaporated and the resin is partially cured to so-called B-stage.

The dry impregnated paper webs 11', 11", 12', 12", 14' and 14" are illustrated schematically on FIG. 1 as rolls which are also normally used. Of course you have a stock of such rolls to insert when the previous set of paper rolls are finished.

The first group 10' of paper webs is arranged with the overlay webs and the decor paper web towards the upper press belt 101. The other group 10" of paper webs is arranged with the overlay webs and the decor paper web towards the lower press belt 102. A separation web $1_B$ is placed between the first group 10' and the second group 10". The separation web $1_B$ consists of a paper web which has a surface coating of electron cured acrylate. Moreover, a first structure web 16' is placed between the upper press belt 101 and the first group 10' of paper webs. A second structure web 16" is placed between the lower press belt 102 and the lower group 10" of paper webs. The surface structure of the structure webs 16' and 16" is directed towards the respective paper webs. Thereby the two laminates produced at the pressing will be provided with a surface structure. Thus, the different webs are continuously fed in between the two press belts 101 and 102 respectively, whereby the paper webs are continuously laminated together at an increased pressure and an increased temperature. The pressure in the press is about 35 bar and the temperature about 180° C.

The separation web $1_B$ as well as the structure webs 16' and 16" can possibly be preheated with an infra heater. Thereby the risk of quality problems caused by differences in coefficient of temperature expansion between the separation webs and the other webs decreases.

The structure foil webs 16' and 16" respectively are separated from their respective groups of paper webs after the pressing by being rolled up on rolls when the laminate formed has passed out from the continuous press 100. The separation web $1_B$ is separated in a similar way from the laminates whereupon the respective back sides of the laminates are possibly ground. In this way the structure foil webs 16' and 16" respectively and the separation web $1_B$ can be re-used. Suitably the possible grinding of the backside takes place continuously whereupon the laminates $10_L'$ and $10_L''$ can be wound up but it can of course also be made when the continuous laminates produced have been cut to sheets.

Base paper webs often have a dark colour. Therefore, they can been seen through a pale decor. This effect can be counteracted by using monochromatic bottom colour paper webs 13 (not shown) which are placed below the decor paper web 12.

Thus, the two groups 10 of paper sheets can each consist of five sheets counted from the upper side of the finished laminate consisting of a) two overlay paper webs 11' and 11" respectively of α-cellulose impregnated with melamine-formaldehyde resin. The innermost of the overlay paper webs 11' and 11" respectively have been coated with hard particles in connection with the impregnation. The hard particles are placed on the side of the web which will be turned outwards from the laminate b) a decorative paper web 12' and 12" respectively impregnated with melamine-formaldehyde resin c) a bottom colour paper web 13' and 13" respectively (not shown) impregnated with melamine-formaldehyde resin d) a base paper web 14' and 14" respectively impregnated with phenol-formaldehyde resin. The different paper webs are dried after the impregnation and then laminated in the same way as above.

FIG. 2 shows schematically an alternative embodiment of a continuous laminating process for the production of a decorative thermosetting laminate. The laminate is produced from a number of paper sheets preferably in the form of webs in between two press belts 101 and 102 of a continuous double belt press 100 and laminated together by pressing in the press at an increased pressure and an increased temperature. The paper webs are divided into two groups 10 each consisting of five sheets, counted from the upper side of the finished laminate consisting of a) two overlay paper webs 11' and 11" respectively of o-cellulose impregnated with melamine-formaldehyde resin. The innermost of the overlay paper webs 11' and 11" respectively have been coated with hard particles in connection with the impregnation. The hard particles are placed on the side of the web which will be turned outwards from the laminate b) a decorative paper web 12' and 12" respectively impregnated with melamine-formaldehyde resin c) two base paper webs 14' and 14" respectively impregnated with phenol-formaldehyde resin. The different paper webs are dried after the impregnation. At the drying the solvent is evaporated and the resin is partially cured to so-called B-stage.

The dry impregnated paper webs 11', 11", 12', 12", 14' and 14" are illustrated schematically on FIG. 2 as rolls which are also normally used. Of course you have a stock of such rolls to insert when the previous set of paper rolls are finished.

The first group 10' of paper webs is arranged with the overlay webs and the decor paper web downwards towards an imagined middle plane between the two groups 10' and 10". The other group 10" of paper webs is arranged with the overlay webs and the decor paper web towards an imagined middle plane between the two groups 10' and 10". Two separation webs $1_B$ are placed between the first group 10' and the second group 10". The separation webs $1_B$ consist of a paper webs which have a surface coating of electron cured acrylate. The separation webs $1_B$ are oriented back to back with the surface structure towards the laminates. The two laminates formed are thus provided with a surface structure at the pressing. The separation webs $1_B$ can alternatively be replaced by one separation web provided with a surface structure on both sides.

Thus, the different webs are continuously fed in between the two press belts 101 and 102 respectively, whereby the paper webs are continuously laminated together at an increased pressure and an increased temperature. The pressure in the press is about 35 bar and the temperature about 180° C.

The separation webs $1_B$ can possibly be preheated with an infra heater. Thereby the risk of quality problems caused by differences in coefficient of temperature expansion between the separation webs and the other webs decreases.

The separation webs $1_B$ provided with a surface structure are separated from their respective groups of paper webs after the pressing by being rolled up on rolls when the laminate formed has passed out from the continuous press 100. The respective back sides of the laminates are then possibly ground. The separation webs $1_B$ can be re-used. Suitably the possible grinding of the backside takes place continuously whereupon the laminates $10_L'$ and $10_L''$ can be wound up but it can of course also be made when the continuous laminates produced have been cut to sheets.

FIG. 3 shows schematically a continuous laminating process for the production of four decorative thermosetting laminates at the same time.

The laminates are produced from a number of paper sheets preferably in the form of webs impregnated with a thermosetting resin and then dried. The dry paper webs are fed between two press belts 101 and 102 of a continuous double belt press 100 and laminated together by pressing in the press at an increased pressure and an increased temperature. The paper webs are divided into four groups of which the two first groups 10' and 10" each consist of four sheets, counted from the upper side of the finished laminate consisting of a) two overlay paper webs 11' and 11" respectively of α-cellulose impregnated with melamine-formaldehyde resin. The innermost of the overlay paper webs 11' and 11" respectively have been coated with hard particles in connection with the impregnation. The hard particles are placed on the side of the web which will be turned outwards from the laminate b) a decorative paper web 12' and 12" respectively impregnated with melamine-formaldehyde resin c) a base paper web 14' and 14" respectively impregnated with phenol-formaldehyde resin. The different paper webs are dried after the impregnation. At the drying the solvent is evaporated and the resin is partially cured to so-called B-stage.

The other two groups 10''' and 10"" respectively each consist of three sheets, counted from the upper side of the finished laminate consists of;

a) one decorative paper web 12' and 12" respectively impregnated with melamine-formaldehyde resin c) two base paper webs 14' and 14" respectively impregnated with phenol-formaldehyde resin The different paper webs are dried after the impregnation. At the drying the solvent is evaporated and the resin is partially cured to so-called B-stage.

The first group 10' of paper webs is arranged with the overlay webs and the decor paper web towards the upper press belt 101. The second group 10" of paper webs is arranged with the overlay webs and the decor paper web towards the lower press belt 102.

The two other groups 10''' and 10"" are placed between the two first groups 10' and 10". The third group 10''' of paper webs is arranged with the decor paper web directed upwards towards the upper press belt and placed closest to the first group 10'.

The fourth group 10"" of paper webs is arranged with the decor paper web directed downwards towards the lower press belt 102 and thus placed closest to the second group 10".

A first separation web $1_B$ is placed between the first group 10' and the third group 10''' while a second separation web $1_B$ is placed between the second group 10" and the fourth group 10"". The separation webs $1_B$ consist of paper webs with a surface coating of electron cured acrylate.

A further separation web $1_B$ is placed between the two groups 10''' and 10"" respectively in the middle. This separation web $1_B'$ consists of an aluminium foil web which is heated by letting an electric current pass through it. The separation web $1_B'$ will then work as a heating element at the pressing, whereby the pressing time in the press will be considerably shortened since the temperature distribution in the laminates formed will be leveled out.

In addition a first structure web 16' is placed between the upper press belt 101 and the first group 10' of paper webs. A second structure web 16" is placed between the lower press belt 102 and the lower group 10" of paper webs.

The surface structure of the structure webs 16' and 16" respectively is directed towards the respective paper webs. Thereby the four laminates produced at the pressing will be provided with a surface structure. Thus, the different webs are continuously fed in between the two press belts 101 and 102 respectively, whereby the paper webs are continuously laminated together at an increased pressure and an increased temperature. The pressure in the press is about 35 bar and the temperature about 180° C.

The separation webs $1_B$ and $1_B'$ as well as the structure webs 16' and 16" can possibly be preheated with an infra heater. Thereby the risk of quality problems caused by differences in coefficient of temperature expansion between the separation webs $1_B$ and $1_B'$ respectively and the other webs decreases.

The structure foil webs 16' and 16" respectively are separated from their respective groups of paper webs after the pressing by being rolled up on rolls when the laminates formed has passed out from the continuous press 100. The separation webs $1_B$ and $1_B'$ respectively are separated in a similar way from the laminates whereupon the respective back sides of the laminates are possibly ground. In this way the structure foil webs 16' and 16" respectively and the separation webs $1_B$ and $1_B'$ respectively can be re-used. Suitably the possible grinding of the backside takes place continously whereupon the laminates $10_L'$, $10_L''$, $10_L'''$ and $10_L''''$ can be wound up, but it can of course also be made when the continuous laminates produced have been cut to sheets.

The two laminates $10_L'$ and $10_L''$ respectively which are made of the first and the second group 10' and 10" respectively can for instance constitute the top layer of a laminate floor. In this case they are glued and suitably pressed towards one side of a particle board or a wood fibre board.

The two laminates $10_L'''$ and $10_L''''$ respectively which are made of the third and the fourth group 10''' and 10"" respectively can for example form the lower so-called counter layer of a laminate floor. In this case they are glued and suitably pressed towards the other side of the particle board or wood fibre board.

The separation web $1_B'$ of aluminium in the middle can possibly be replaced by a separation web of paper having a surface coating of electron cured acrylate. Then the passage of an electric current is excluded. The decreased heat supply can be compensated by impregnating the two middle groups 10''' and 10'''' with a resin where the curing composition is adapted to a lower temperature.

The invention is not limited to the embodiments shown since these can be modified in different aways within the scope of the invention. For instance the laminates can be provided with a surface structure via rolls furnished with a surface structure. These rolls can be pressed continuously or discontinuously against the laminates when the laminates have passed the press belts.

What is claimed is:

1. A process for the continuous production of a thermosetting laminate made of a number of continuous paper webs impregnated with a thermosetting resin and then dried, said process comprising continuously feeding the dry webs into a continuous double belt press laminating the webs together in the press at an increased temperature and an increased pressure, wherein the continuous paper webs are divided into at least two groups each consisting of at least two sheets of which at least one is impregnated with a thermosetting resin, whereby a first structure foil web is placed between the upper press belt and the first group of paper webs and a second structure foil web is placed between the lower press belt and the second group of paper webs with its surface structure turned towards respective paper webs, the first and the second group of paper webs each comprises at least one decor paper web, the decor paper web of the first group being turned with the decor towards the first structure foil web, the decor paper web of the second group being turned with the decor towards the second structure foil web, one or more separation webs or separation sheets being placed between the first group and the second group which separation webs and separation sheets respectively are used for separating the groups of paper webs from each other after a finished pressing whereby the two laminates formed at the same time are provided with surface structure at the pressing.

2. The process according to claim 1, wherein for each group the separation sheet is one selected from the group consisting of an unimpregnated paper web, a paper web impregnated with a thermosetting resin on one side and a paper web coated with a thermosetting resin on one side wherein when the unimpregnated paper web or paper web with an uncoated side is present, turning the impregnated or uncoated side away from the laminate.

3. The process according to claim 2, further comprising selecting at least one paper web selected from the group consisting of a paper web coated with a thermosetting resin on one side and a paper web impregnated with a thermosetting resin on one side; and turning the coated or impregnated side inwardly towards the laminate.

4. The process according to claim 1, wherein for each group the separation sheet is one selected from the group consisting of a paper web coated with a thermosetting resin on a first side, the other side of the web being coated or impregnated with a passive material, and turning the first side towards the respective group.

5. The process according to claim 4, wherein the passive material is one selected from the group consisting of alginate, metal and plastics.

6. The process according to claim 5, wherein the metal is aluminum.

7. The process according to claim 5, wherein the plastic is at least one selected from the group consisting of electron cured acrylate, polyphenyl oxide, polyimide and polyvinylidene fluoride.

8. The process according to claim 1, wherein the separation sheet consists of at least one separation web.

9. The process according to claim 8, wherein the separation web consists of
   a) a metal;
   b) a plastic foil; or
   c) paper.

10. The process according to claim 9, wherein each separation web is provided with a surface structure and two such separation webs are placed back to back with the structure side towards the first and the second group of paper webs.

11. The process according to claim 9, wherein each separation web is provided with a surface structure on both sides.

12. The process of claim 9, wherein the metal is at least one selected from the group consisting of aluminum, steel and copper.

13. The process of claim 9, wherein the plastic foil is at least one selected from the group consisting of polyamide, polyoxymethylene, polycarbonate, polyfluorethene, polyvinylidene fluoride, polyphenyl oxide, polyether sulphone, polyimide and polysiloxane.

14. The process of claim 9, wherein the paper has a surface coating of at least one material selected from the group consisting of electron cured acrylate, polyphenyl oxide, polyimide, polyvinylidene fluoride, and aluminium.

15. The process according to claim 8, wherein a first and a second group of paper webs each comprising one decor paper web the decor paper web of the first group being turned with the decor away from the upper press belt down towards an imagined middle plane, the decor paper web of the second group being turned with the decor away from the lower press belt upwards towards the imagined middle plane and placing at least one separation webs between the first group and the second group.

16. The process according to claim 8, comprising heating at least one of the separation webs whereby the curing of the laminate is achieved.

17. The process of claim 16, wherein the heating is achieved by preheating the webs before feeding the webs between the press belts.

18. The process of claim 17, wherein the preheating is by means of an infrared heater.

19. The process of claim 17, wherein the preheating is by means of an induction heater.

20. The process of claim 17, wherein the heating is achieved by passing an electric current through the webs.

21. The process according to claim 1, wherein a first and a second group of paper webs each comprises at least one decor paper web, the decor paper web of the first group being turned with the decor towards the upper press belt, the decor paper web of the second group being turned with the decor towards the lower press belt and placing at least one separation webs between the first group and the second group.

22. The process according to claim 21, wherein the first group comprises at least one of intermediate overlay paper webs; underlying decor paper webs, bottom color paper webs and base paper webs.

23. The process according to claim 21, wherein the second group comprises at least one of intermediate overlay paper webs; underlying decor paper webs, bottom color paper webs and base paper webs.

24. The process according to claim 1, wherein a first structure web is placed between the upper press belt and the first group of paper webs and a second structure web is placed between the lower press belt and the second group of paper webs with a surface structure of said first and second structure webs being turned towards respective paper webs, whereby at least two laminates are formed at the pressing, each laminate being provided with a surface structure.

25. The process according to claim 24, comprising separating the structure web from the groups of paper and rolling the structure web up on a roll.

26. The process according to claim 24, comprising separating the separation webs from the laminate passing out from the continuous press and rolling the separation web up on a roll.

27. The process of claim 24, wherein the laminate passing out from the continuous press has a front side and a backside, the process further comprising grinding the backside of the laminate.

28. The process according to claim 1, wherein a) the decor paper webs are at least one selected from the group consisting of a dry paper web of α-cellulose, and a traditional white paper impregnated with a thermosetting resin, the webs being provided with a decorative printing or surface layer;

b) overlay paper webs comprise a dry paper webs of α-cellulose impregnated with a thermosetting resin;

c) bottom color paper webs are at least one selected from the group consisting of dry paper webs of α-cellulose and traditional white paper impregnated with a thermosetting resin;

d) base paper webs consist of conventional dry underlayer paper webs impregnated with a thermosetting resin, the thermosetting resin in the web placed closest to the decor paper web consisting of melamine-formaldehyde resin while the rest of base paper webs contain phenol-formaldehyde resin or mixtures of melamine-formaldehyde resin and phenol-formaldehyde resin; and the various paper webs, after drying, when the solvent of the resin is evaporated and the thermosetting resin is partially cured to so-called B-stage, are continuously laminated together at an increased pressure and an increased temperature.

29. The process according to claim 28, wherein the thermosetting resin used in any of the decor paper webs, the overlay paper webs and the bottom color paper webs is melamine-formaldehyde resin.

30. The process according to claim 1, wherein the pressure in the press is 5–80 bar, and the temperature is 80–250° C.

31. The process of claim 30, wherein the pressure is 20–70 bar.

32. The process of claim 30, wherein the pressure is 30–55 bar.

33. The process according to claim 1, wherein at least one of the paper webs impregnated with a thermosetting resin, is coated with hard particles with an average particle size below 1000 μm.

34. The process of claim 33, wherein the hard particle is one selected from the group consisting of silica, aluminum oxide, silver carbide and combinations thereof.

35. The process of claim 33, wherein the outermost web is impregnated with a thermosetting resin and coated with hard particles.

36. A process for using a double-belt press having an upper belt and a lower belt, the process being used to continuously produce a thermosetting laminate from a plurality of continuous paper webs impregnated with a thermosetting resin and then dried and including the steps of:

dividing the continuous paper webs into at least a first group and a second group, each group having at least two sheets, at least one of which is a decor paper web;

impregnating at least one of the sheets in each group with a thermosetting resin;

positioning the decor paper web of the first group with the decor towards the upper belt;

positioning the decor paper web of the second group with the decor towards the lower belt;

placing at least one separation web between the first group and the second group;

continuously feeding the webs into the double belt press;

laminating the webs together in the press at an increased temperature and an increased pressure, thereby forming two laminates simultaneously, and, after the laminating step, separating the groups of paper webs from each other at the separation web; and forming a surface structure on at least one of the laminates by providing at least one roll having a structure pattern, and providing at least one counter roll, and, positioning the at least one roll and the at least one counter roll downstream of the double-belt press, so that the laminate passes therebetween after leaving the double-belt press, with the decor side facing said at least one roll, and, applying pressure between the at least one roll and the at least one counter roll as the laminate passes therebetween.

37. The process according to claim 36, wherein the pressure is one selected from continuous and discontinuous pressure.

* * * * *